United States Patent [19]

Campbell et al.

[11] Patent Number: 4,692,564
[45] Date of Patent: Sep. 8, 1987

[54] CABLE SUPPORT SYSTEM

[75] Inventors: Eric R. Campbell, Alpharetta; Joe B. Moss, Lawrenceville, both of Ga.

[73] Assignees: American Telephone & Telegraph Company, AT&T Technologies, Inc., Berkeley Heights; AT&T Bell Laboratories, Murray Hill, both of N.J.

[21] Appl. No.: 835,022

[22] Filed: Feb. 28, 1986

[51] Int. Cl.⁴ .......................................... H02G 15/113
[52] U.S. Cl. ........................................ 174/92; 174/76; 174/88 R
[58] Field of Search ................ 174/92, 93, 88 R, 76

[56] References Cited

U.S. PATENT DOCUMENTS

| 3,636,241 | 1/1972 | Baumgartner et al. | 174/92 |
|---|---|---|---|
| 3,796,823 | 3/1974 | Wright et al. | 174/92 |
| 3,875,325 | 4/1975 | Anderson et al. | 174/92 |
| 3,895,180 | 7/1975 | Plummer | 174/92 |
| 4,084,066 | 4/1978 | Gillemot | 174/93 X |
| 4,181,814 | 1/1980 | Smith | 174/92 |
| 4,219,693 | 8/1980 | French | 174/135 |
| 4,314,092 | 2/1982 | Fleming et al. | 174/76 X |
| 4,363,931 | 12/1982 | Simons | 174/37 |
| 4,388,488 | 6/1986 | Wleck et al. | 174/92 |
| 4,426,108 | 4/1984 | Kesselman | 174/92 X |
| 4,442,154 | 4/1984 | Fortsch et al. | 174/92 X |
| 4,442,155 | 4/1984 | Foertsch et al. | 174/92 X |
| 4,511,415 | 4/1985 | Dienes | 174/92 X |
| 4,512,828 | 4/1985 | Helm | 174/88 R X |
| 4,518,448 | 5/1985 | Henry | 174/92 X |

OTHER PUBLICATIONS

Brochure by Condor Communications Products of Garland, Texas, 1982.
Brochure by PSI Telecommunications, Inc. of Burbank, Calif.

Primary Examiner—Morris H. Nimmo
Attorney, Agent, or Firm—Edward W. Somers

[57] ABSTRACT

A cable closure includes two spaced end plugs (110-110) through which cable end portions extend and two cover portions (60-60) which are mated together along tongue and groove portions and held together by C-shaped clamps that engage the tongue and groove portions. Conductors of the cables are spliced together and enclosed in a membranous container (40) which subsequently is caused to be filled with an encapsulant. The cover portions, which in a preferred embodiment are identical, include internally disposed plates each having spaced end strap portions which secure the cable end portions extending through the end plugs into the closure at locations external to the membranous container and prevent unintended lateral, longitudinal and torsional movement of the splice work relative to the encapsulant. This is particularly important when as here the closure is filled with an encapsulant and relative movement between the cable portions and encapsulant is to be avoided to maintain the integrity of the encapsulant and prevent the ingress of moisture.

13 Claims, 12 Drawing Figures

Fig_2

Fig_10

CABLE SUPPORT SYSTEM

TECHNICAL FIELD

This invention relates to a cable support system. More particularly, it relates to a cable closure which includes facilities for holding cable portions that extend into the closure to prevent unintended movement of spliced portions thereof relative to a water-blocking material which encapsulates the spliced cable portions.

BACKGROUND OF THE INVENTION

When two or more cables such as telecommunications cables are spliced together, the splice area is ordinarily housed within a protective cover known as a closure. Such closures often have included cylindrical covers with one or more longitudinal joints and end plugs that surround incoming and outgoing cables and that form seals with the covers. An example of a prior art closure is shown in U.S. Pat. No. 3,636,241 which issued on Jan. 18, 1972 in the names of R. G. Baumgartner et al. Closures which are effective in providing protection for the splice connections are available in the marketplace, but in many instances their assembly is relatively time consuming, often requiring specialized tools and equipment which in a limited space such as a narrow trench are difficult to handle and operate. Also, because of the number of different size cables in the field, a user must inventory a corresponding number of different size closures.

Common to substantially all closures is the requirement that they restrict moisture ingress. Cables which are spliced in closures that are buried or that are located underground in manholes are especially vulnerable to moisture. The integrity of systems which are used to restrict moisture ingress is important especially because of transmission parameters which are readily affected by changes in the moisture content within the cable. Water can enter a splice area through an enclosure imperfection or through one of the cables, in the latter case travelling from a point of damaged cable sheathing, along the conductor core, to the connections between the spliced conductors.

Various systems are used for providing a waterproof closure. To prevent the ingress of moisture, some systems employ dry air, nitrogen or a similar chemically inert gas in the cables and closures. In these types of closures, the gas is pressurized to create a flow from enclosed equipment through any openings and prevent the ingress of moisture. In the recent past, closures have been filled with a curable, liquid water-blocking encapsulant to provide moisture protection or sealed in ways other than with pressurized gas. For example, another commonly used closure includes a heat shrinkable sleeve.

Not infrequently, due to line failure or routine maintenance, one or more newly installed cables must be joined or some of the conductors are rejoined to others. Thus the reentry of and the effective resealing of the closure becomes necessary. Accordingly the reentry of the closure and its resealing should be made as easy as possible. The reentry of some prior art closures that are filled with a water-blocking material is a time-consuming task for a craftsperson.

In one prior art system disclosed in application Ser. No. 619,266 filed on June 11, 1984, in the names of F. J. Mullin and W. C. Reed, a sheet of an elastomeric material in the form of a bladder is adapted to envelop spliced conductors, and to provide containment for a liquid encapsulant at a pressure that is substantially greater than ambient pressure. Filling the bladder with liquid encapsulant and controlling the pressurizing of the encapsulant ensures the formation of a substantial layer of encapsulant between the spliced conductors and the walls of the bladder, and urges encapsulant into voids and for some distance into the cable core at each end of the closure. Should enough encapsulant penetrate into the cables to cause a drop of pressure within the containment bladder, additional encapsulant can be pumped into the bladder, thereby increasing the pressure again to the desired level, and restoring encapsulant to a volumetric level which is sufficient to protect the splice connections. The bladder is enclosed in a substantially rigid shell or cover, which serves to protect the bladder as well as to limit the expansion of the bladder under pressure.

The containment facilities in the above-disclosed application are adapted to maintain the pressure for a time sufficient for at least a part of the encapsulant to solidify. This arrangement results in the provision of an effective gasket because the encapsulant cures while pressurized and under a compressive load. Many cables comprise materials with which it is difficult or impossible to form an adhesive bond. Compressively loaded, cured encapsulant, urged against any surface it contacts, resists water intrusion along surfaces with which the encapsulant does not form an adhesive bond.

Encapsulation type closure systems are widely used, especially in the telecommunications industry. Therefore an approach that substantially retains the advantages of encapsulation systems, e.g., convenience, reenterability, and economy, while increasing the effectiveness of the encapsulant in preventing water-induced damage to the splice connections, would be of considerable interest.

A problem which arises in encapsulant-filled closures relates to the movement of the cable end portions within the closure. This is apt to happen particularly because of the handling of the closure subsequent to the splicing operations. When the cable or cables are flexed, movements are propagated to the splice connections. These cause the water-blocking material to fracture which results in water paths being formed through the encapsulant. It is most desirable to keep any movement that reaches the splice work to a minimum. This requirement must be taken into account in the design of a shell or cover for the bladder arrangement described hereinbefore.

The prior art has addressed this problem. Arrangements are available commercially in which a length of cable, including a splice location, is supported in a cradle and secured to the cradle with circumscribing wire-like ties. Although these arrangements have helped, they have not been completely satisfactory in preventing substantially any cable movement relative to the encapsulant.

What is needed and what the prior art seemingly does not include is an easily assembled, reenterable closure adapted to receive an encapsulant. The closure should comprise a relatively small number of components and be assembled easily about splice connections. Also, the closure should include a cable support system which is such that relative movement between cable end portions that extend into the closure and the encapsulant is minimized. It does not appear that the prior art includes such a relatively inexpensive, reliable closure which is assembled readily in the field and which includes provisions for inhibiting movement of portions of the cable relative to the encapsulant.

SUMMARY OF THE INVENTION

The foregoing problems have been overcome by the closure of this invention which is adapted to have cables extending thereinto where conductors of the cables are spliced together. The closure includes a substrate for supporting a length of at least one cable to provide access to transmission media within the cable, and stabilizing facilities which are attached to the substrate at a location external to a portion of the cable length. The stabilizing facilities have a portion disposed between the length of the cable and the substrate and portions extending from the portion between the cable and the substrate about the cable. Facilities are provided for securing the stabilizing facilities to the cable and cooperating with the stabilizing facilities to provide sufficient engagement with the cable to prevent substantially any movement of the portion of the cable length relative to the substrate. One closure includes containment means for enclosing at least a portion of the at least one cable and adapted to hold an encapsulating material which encapsulates portions of the cable. In a preferred embodiment, cover portions are used to enclose the containment means. Also, stabilizing facilities which are secured to the supporting substrate external to the containment means inhibit relative movement between the encapsulant and the cable end portions. Otherwise, voids in the encapsulant occur and lead to the intrusion of water into the splice connections.

In the preferred embodiment, the cover portions are identical and facilities are provided for releasably securing together the two cover portions. The securing facilities may include a C clamp having legs which have a particular configuration to cause depending portions of the legs to snap-lock into depressions in tongue and groove portions of the covers. Relative movement between the cable portions within the containment means and the encapsulant is prevented by causing internally disposed end strap portions of stabilizing plates to become wrapped about the cable end portions. The plates are attached to opposite ends of one of the cover portions. At least one portion of each plate remains in engagement with an inner surface of the cover portion to resist torsional forces.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION

Figures 1A, 1B:
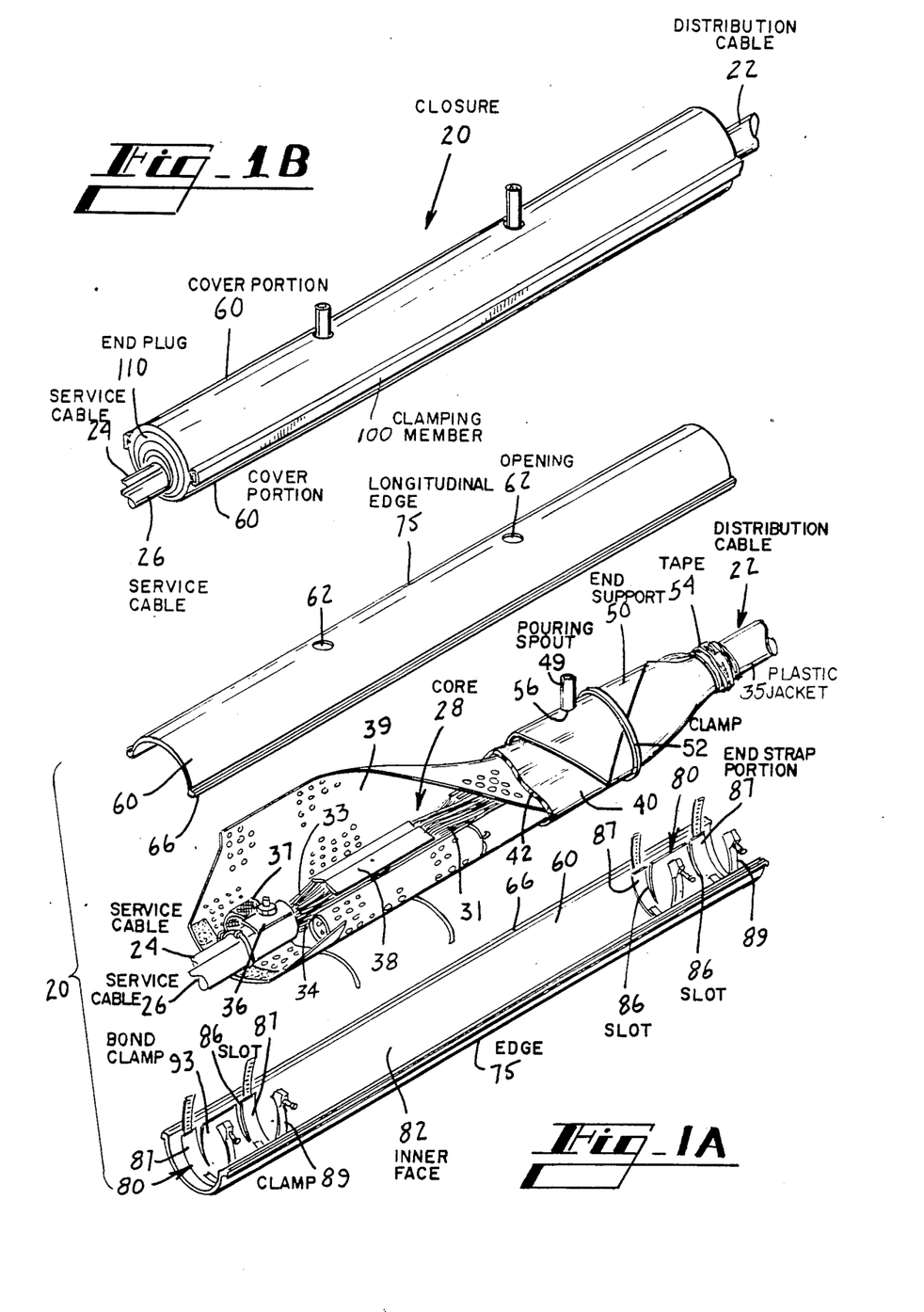
FIG. 1A is an overall exploded perspective view of a closure of the invention.
FIG. 1B is an overall perspective view of a closure of this invention after it has been assembled.
Figure 2:
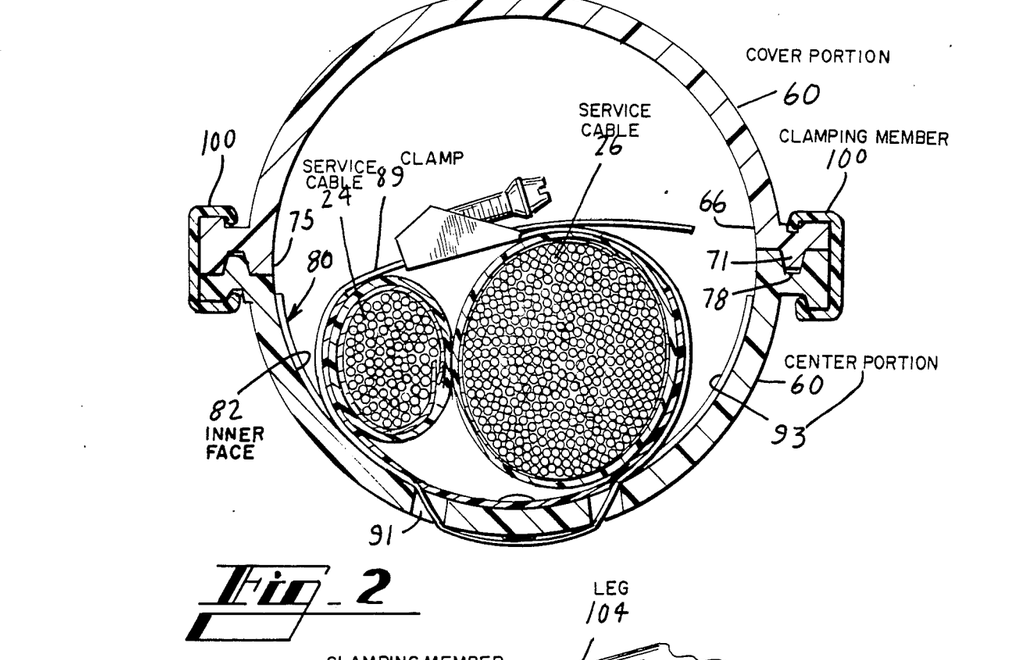
FIG. 2 is a an end sectional view of the closure which shows service cables held in engagement with one of two assembled cover portions.

Referring now to FIG. 1, there is shown an exploded view of a closure, which is designated generally by the numeral 20, for enclosing splice connections between a distribution cable 22 and service cables 24 and 26 (see also FIG. 2). The cable 22 includes a core 28 comprising conductors 31—31 which are to be spliced to conductors 33—33 and 34—34 of the service cables 24 and 26, respectively.

The service cables 24 and 26 extend service from the cable 22 to customers' premises, for example. Typically, the cable 22 comprises a metallic shield (not shown) and a plastic jacket 35, which are removed from a portion of its length to expose the conductors 31—31 of the cable. Such a location occurs along a length of distribution cable whereat it is desired to provide access for runs to the customers' premises. At the uncovered portion of the distribution cable 22, the conductors 33—33 and the conductors 34—34 of the service cables 24 and 26, respectively, are spliced to conductors 31—31 of the distribution cable and run to the customers' premises.

As should be well known, electrical continuity must be carried across the splice location. This is accomplished by well known techniques in which bond clamps 36—36 are caused to be connected electrically to the shields of the distrubution and service cables. A grounding wire 37 is used to interconnect the bond clamps to carry electrical continuity across the splice. See, for example, U.S. Pat. No. 4,558,174 which issued on Dec. 10, 1985 in the name of John R. Massey.

FIG. 1A shows end portions of cables 22, 24 and 26 with insulated conductors extending beyond the cable sheath, and the conductors connected electrically by means of connectors 38—38. The totality of wires, connectors, and other splice-related hardware of a cable splice is often referred to as the splice work. Generally, the splice work rests in an organizer 39 which typically is attached to the cable ends.

After the cables haved been spliced together, the splice work is enclosed in a membranous container 40 (see FIGS. 1 and 3) which is formed from a sheet 42. The sheet 42 which is disclosed in the aforementioned Mullin-Reed application comprises an elastomer material, e.g., 0.03 inch thick neoprene, cut into a generally rectangular shape. A circumferential strip of the material is provided on one side with a pressure-sensitive butyl-rubber-based mastic coating, for example, protected from inadvertent contact by peel-off paper. The remaining area of the sheet is free of adhesive. A polyurethane pouring spout 49 extends through an aperture in the sheet and is affixed to the sheet. The membranous container 40 is produced by wrapping the sheet 42 around the splice work, removing lengths of peel-off paper from opposing sheet portions and pressing the thus exposed, opposed adhesive-covered portions together.

The membranous container 40 is completed by joining the remaining edge portions together or to the cable, in a manner that will be readily understood by those skilled in the art. Although it may be possible to form a relatively strong adhesive bond between the sheet material and the cable sheath, it is advantageous to secure further the membranous container 40 to the cable by mechanical means, such as ties, which are applied tightly around the joint between the cable and the sheet 42.

The membranous container 40 is adapted to hold an encapsulating material which encapsulates the splice connections and adjacent portions of the conductors and cables. Such a material is well known in the art and is exemplified by one disclosed in U.S. Pat. No. 4,168,258.

Afterwards, end supports 50—50 (see FIGS. 1 and 3) are provided for the membranous container 40. Each end support 50 is made of a material more rigid than that of the membranous container 40 and is wrapped about the neck of the membranous container. An outwardly facing end of the support is secured to the cable with a clamp 52 and tape 54 having adhesive on one surface thereof. Each end support 50 also includes an opening 56 through which extends the spout of the membranous container 40.

Typically, it is advantageous to support the membranous container 40 and end portions of the cables which are spliced together. This may be accomplished with a cable support member which extends across the splice work to locations external to the membranous container. In a preferred embodiment, the membranous container 40 is enclosed in a reinforcing protective enclosure. Accordingly, the cable closure of this invention includes two cover portions 60—60 (see FIGS. 1-3) each of which is made of a plastic material. Each of the cover portions 60—60 is semicircular in cross-section and has a generally uniform wall thickness. In a preferred embodiment, the cover portions are identical. Further, each of the cover portions 60—60 includes openings 62—62. When the cover portions 60—60 are assembled to enclose the membranous container 40, the spout of the membranous container 40 protrudes through one of the openings 62—62 in one of the cover portions to provide access to the splice work.

Further, it should be apparent that the cover portions 60—60 may have geometrical configuration other than that shown. For example, it is within the scope of this invention that each cover portion could have a square or rectangular cross-sectional shape.

Figure 3:
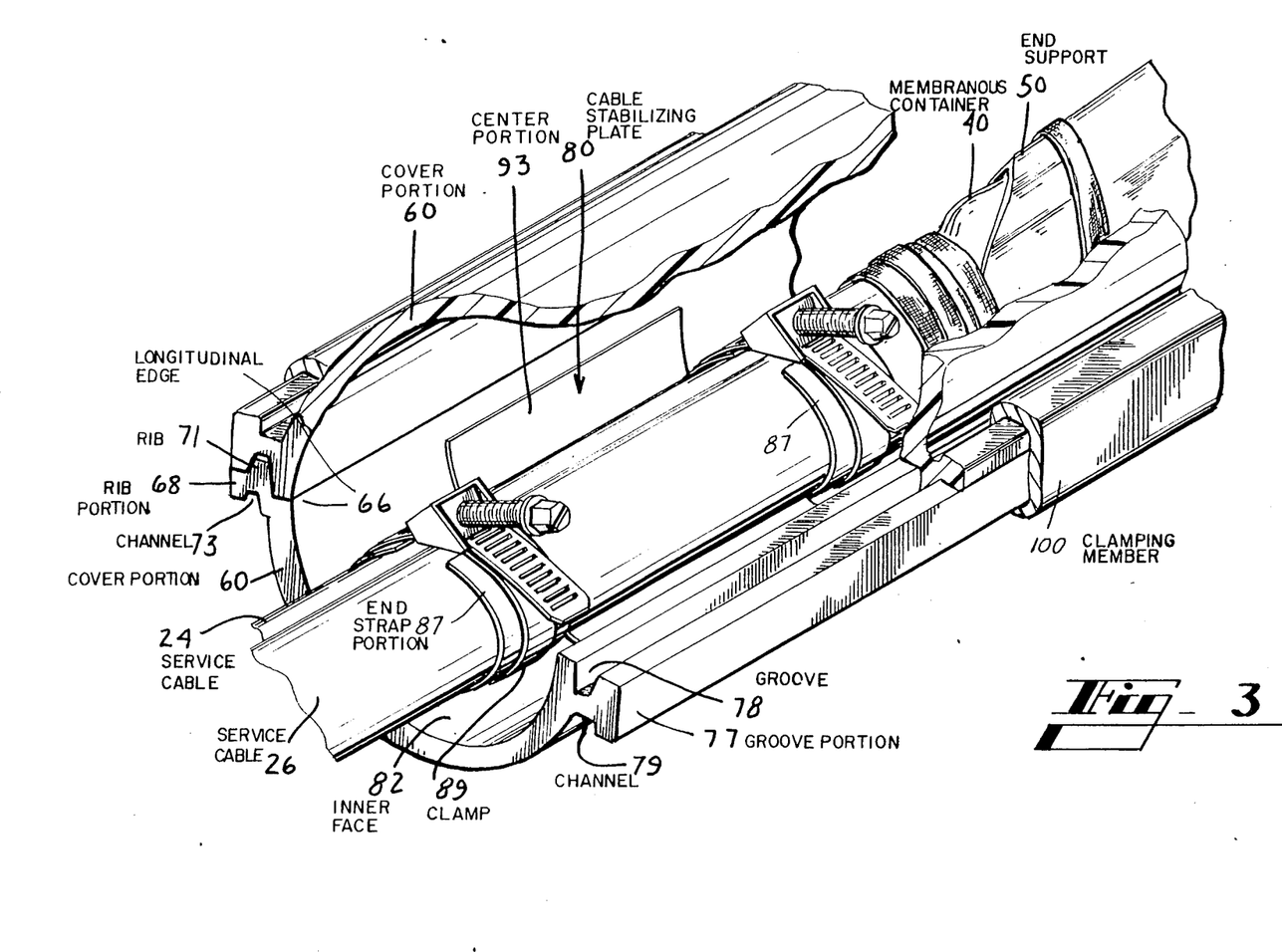
FIG. 3 is a perspective view of facilities which immobilize splice work between cables against movement relative to an encapsulant.
Figure 4:
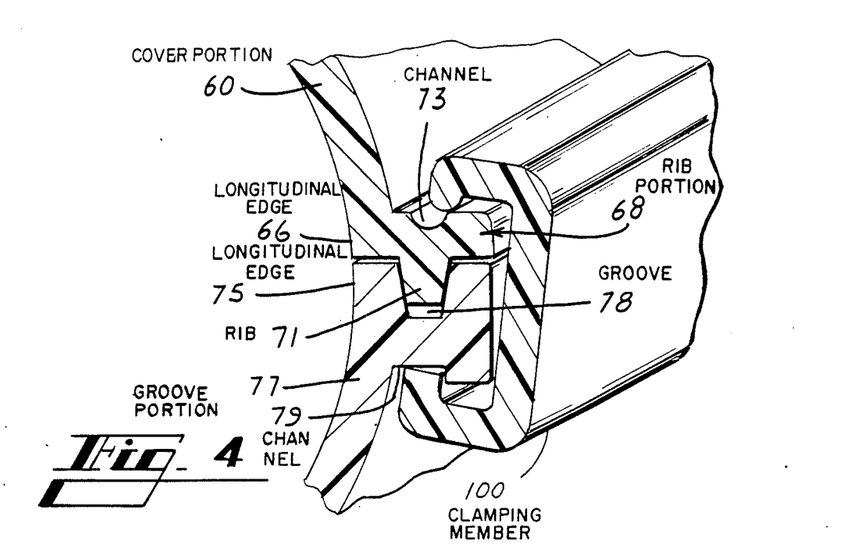
FIG. 4 is a detail view of cover edge portions of the closure.
Figures 5, 6:
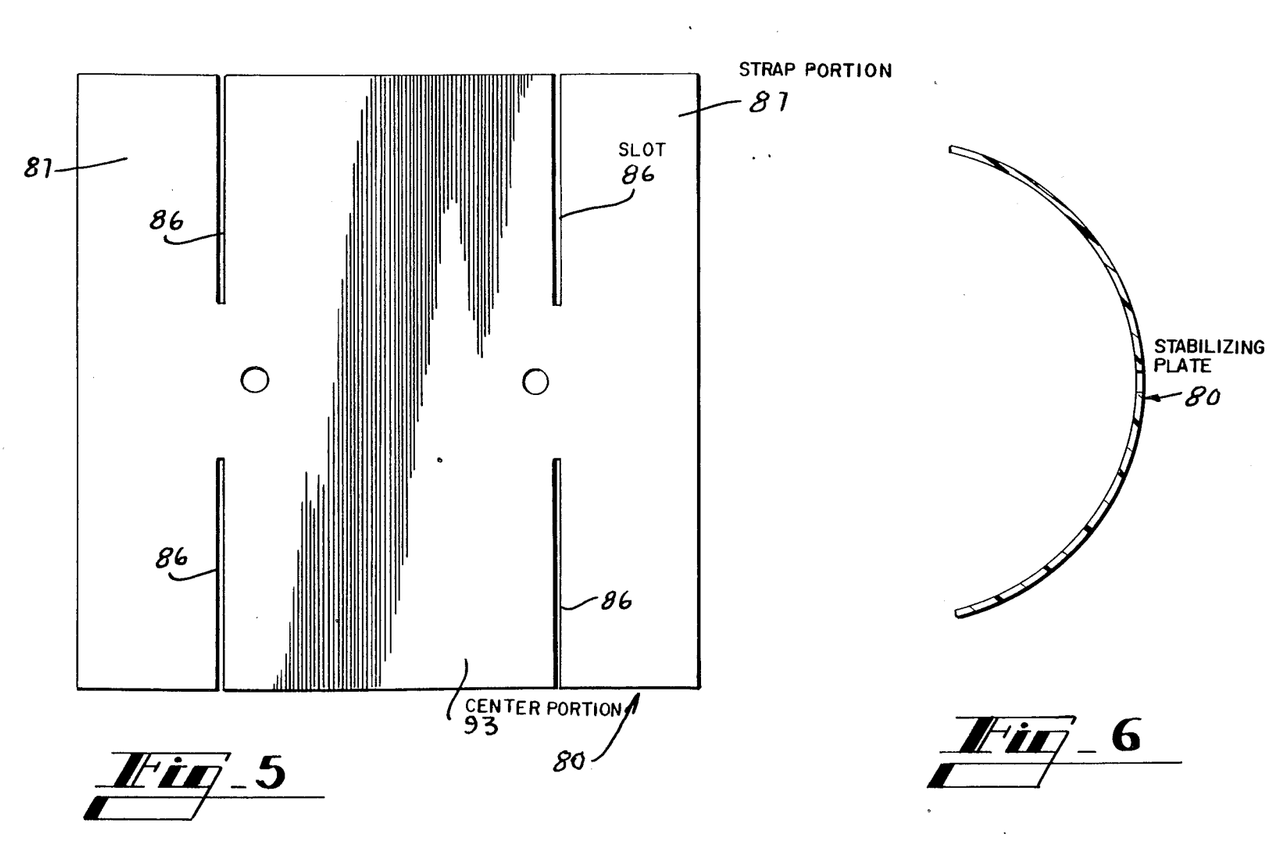
FIG. 5 is a plan view of a stabilizing plate which is used to secure a cable or cables to a cover portion.
FIG. 6 is an end view of the stabilizing plate of FIG. 5.

Extending along one longitudinal edge 66 (see FIGS. 1-3) of each cover portion 60 is a rib portion 68 (see also FIG. 4). The rib portion 68 includes a longitudinally extending rib 71 and an opposed channel 73. Extending along the other longitudinal edge 75 of each cover portion is a groove portion 77. The groove portion 77 includes a groove 78 which is oriented in the direction of the open face of the cover portion and a channel 79 on an opposite side thereof. When the cover portions 60—60 are mated together, the rib 71 of one portion is received in the groove 78 of the other cover portion and the groove 78 of the one portion is adapted to receive the rib 71 of the other cover portion.

Figure 7:
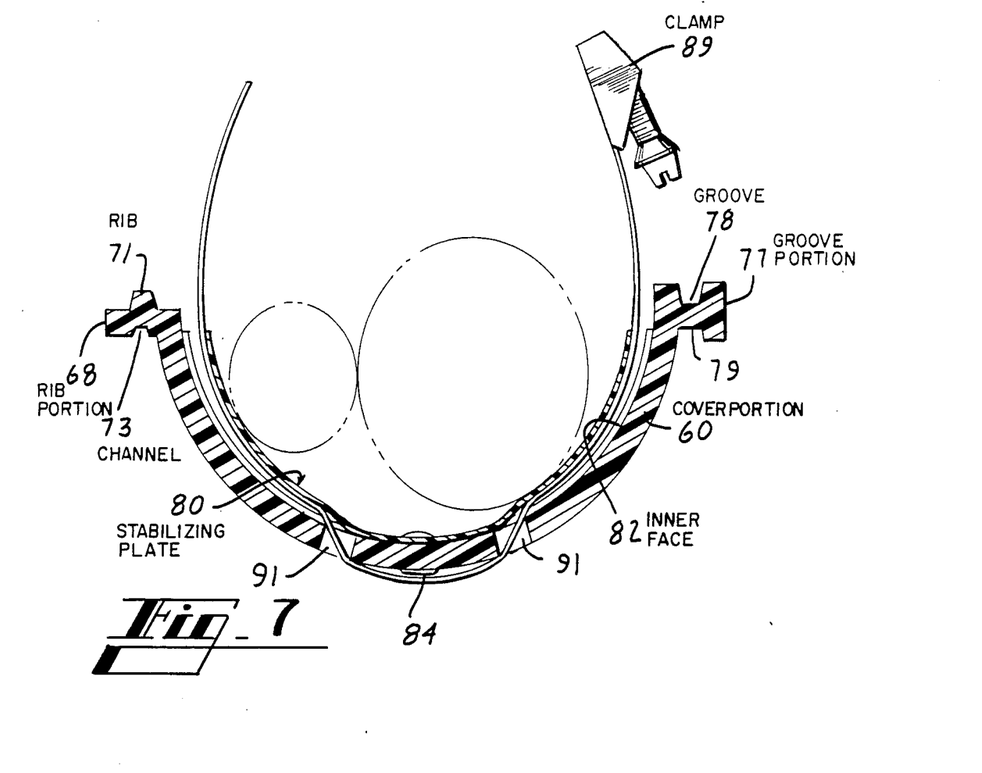
FIG. 7 is an enlarged view of a cover portion of the closure with a strap portion of the stabilizing plate secured thereto and with a clamp disposed about the strap portion.

It should be observed that one of the cover portions 60—60 includes a cable stabilizing plate 80 (see FIGS. 1-3 and 5-6) which is secured to an inner face 82 of the one cover portion near each end thereof. Generally, this is accomplished by means of a rivet 84 (see FIG. 7). The cable stabilizing plate 80 is arcuately disposed and conforms to the curvature of the cover portion 60. Also, it includes a pair of slots 86—86 which are spaced along each edge and which extend inwardly to form two spaced end strap portions 87—87. When a cable end portion, for example, is positioned over the cable stabilizing plate 80, the end strap portions thereof may be wrapped about the cable. The wrapped end strap portions are secured about the cable by a clamp 89, for example, which extends through openings 91—91 in the one cover portion 60 and about the curved strap portions 87—87 of the cable stabilizing plate and cable.

It should be observed that each end strap portion 87 of each cable stabilizing plate 80 has a length such that when it is wrapped about the cable, its ends are spaced apart (see FIG. 3). This arrangement allows movement of the free end portions of the strap portion when the clamp 89 is tightened. Otherwise, ends initially in engagement with each other would inhibit the effectiveness of the clamp 89. Also, it permits one stabilizing plate 80 to be suitable for a plurality of different cable sizes as well as for pairs of cables of different sizes.

The two spaced strap portions 87—87 hold the cable which is positioned in engagement with the cable stabilizing plate 80 against unintended lateral and longitudinal movement. Both horizontal and vertical lateral movement, as viewed in FIG. 2, are inibited. Further the two spaced strap portions 87—87 cooperate with a center portion 93 (see FIG. 3) of the cable stabilizing plate which remains in engagement with the inner surface 82 of the one cover portion 60 to provide torsional and bending stability for the cable.

This arrangement is important in order to prevent relative movement between the splice work of the cables and the encapsulating material. If the spliced portions of the cables move, cracks in the encapsulant are formed and, undesirably, water paths are created. With the cable stabilizing arrangement of this invention, the encapsulant remains generally in engagement with the portions of the cable splice work and closure, thereby substantially avoiding the formation of cracks which are potential paths for the ingress of moisture.

The supporting mechanism for each entering cable is external to and separate from the encapsulated splice work. The cable stabilizing arrangement is effective to immobilize the portions of the cables between the stabilizing plates 80—80 against deflection relative to the encapsulant. Inasmuch as the end portion of each cable just outside the membranous container 40 is fixedly attached to a cover portion 60, the splice work between these points is protected against unwanted movement relative to the encapsulant. Lateral and torsional motion of the cable are transferred effectively to the cover portion 60 by the stabilizing plate 80 instead of being transmitted to the encapsulated splice work.

Figure 8:
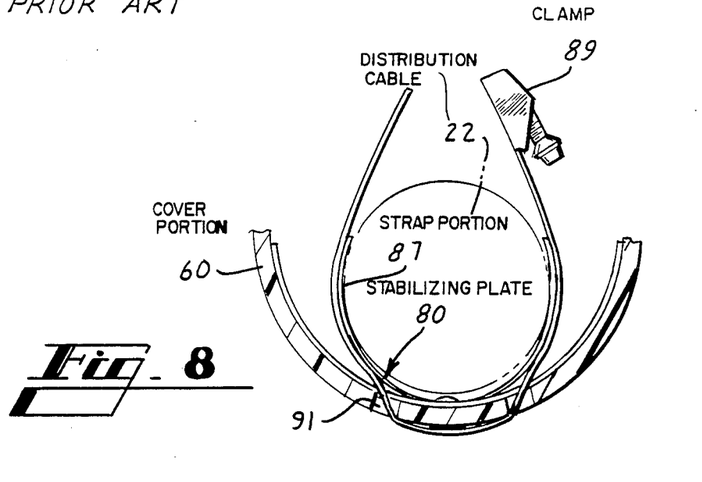
FIGS. 8 and 9 are enlarged end views of cables in position to be secured to a cover by the arrangement of this invention and by a prior art arrangement, respectively.

The effectiveness of the stabilizing arrangement in securing the cables against unintended movement in several directions can best be seen by viewing FIG. 8. The cable is unable to move either vertically or horizontally. Because the stabilizing plate 80 is attached to the cover portion 60 between the cable and the cover, and is secured to the cable through the end strap portions, the cable is unable to shift laterally horizontally as seen in FIG. 8. Portions of the stabilizing plate 80 extend from the portion between the cable and the cover portion 60 upwardly about the cable. The stabilizing plate 80 and clamps 89 cooperate to provide sufficient engagement with the cable 22 or cables 24 and 26 to prevent relative movement between the cable or cables and the cover portion 60. This is unlike the support arrangement shown in FIG. 9. There, it would be apparent that vertical movement of the cable is precluded by a tie 95. However, because of the arrangement of the tie 95 with respect to the cover, the cable is able to move horizontally. Accordingly, the support mechanism of this invention enhances the effectiveness of the encapsulant by substantially preventing cracking of the encapsulant.

It should be appreciated that after the membranous container 40 has been placed about the spliced portions of the cables 22, 24 and 26 and the cover portions 60—60 assembled together along the interlocking edge portions, the cover portions must be secured together. This is accomplished with a C-shaped clamping member 100 which may be made of a plastic or metallic material and which is shown in FIGS. 2-4 and 10. It will be observed that the C-shaped clamping member 100 includes a back 102, two legs 104-105 each attached at one of its ends to the back and two foot portions 106 and 107, each foot portion being attached to a free end of a leg portion. Each foot portion 106 and 107 is adapted to be received in a channel of a groove portion or a rib portion when the clamping member is snap-locked over the interlocking longitudinal edge portions (see FIGS. 2-4).

Figure 10:
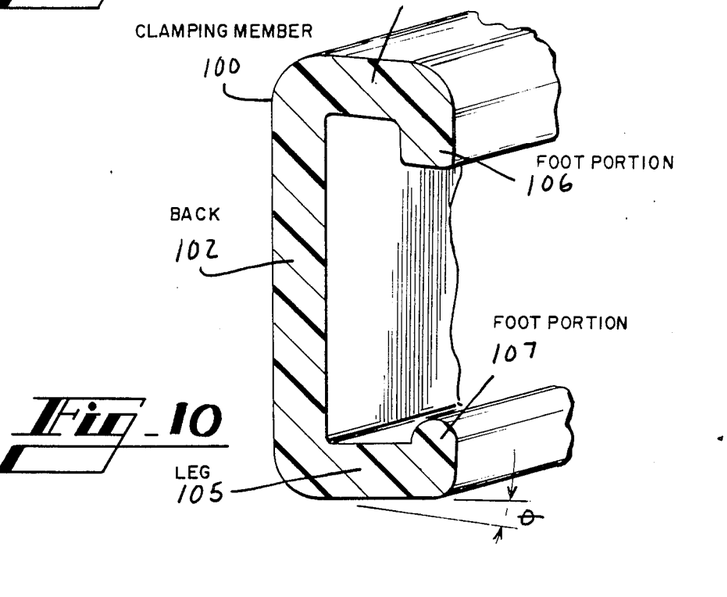
FIG. 10 is an enlarged view of a cover side clamp.

In order to secure together the cover portions 60—60, the legs 104-105 of the clamping member 100 are non-parallel. They converge in a direction away from the back with one of them, the leg 104 being normal to the back. An angle $\theta$ which the other leg 105 makes with the normal to the back 102 is predetermined to facilitate assembly and disassembly of the clamping member 100 with the cover portions. After the clamping member 100 has been assembled to mating cover portions 60—60, the legs 104 and 105 are generally parallel and each foot portion is received in one of the channels. But for this arrangement, the legs 104-105 would diverge outwardly and may slide out of engagement with the interlocked portions.

It should be pointed out that the interlocking longitudinal edge portions function to prevent movement of the longitudinal edge portions outwardly because of the subsequent introduction of encapsulant into the container 40. The use of a side clamping member such as the clamping member 100 prevents disengagement of the cover portions 60—60 when encapsulant is introduced into the membranous container 40. Also, because the clamping members 100—100 may be snap-locked over the longitudinal rib and groove portions of the cover portions 60—60, the space required, either in manholes or excavated trenches, need not be as great as in other arrangements.

After the cover portions 60—60 have been closed and secured, liquid encapsulant is introduced into the container 40. The liquid encapsulant can be introduced into the membranous container 40 by any appropriate means, and the encapsulant is maintained in its initial position for a time sufficient to result in at least partial solidification of the encapsulant. A procedure for introducing the encapsulant is to gravity-feed the material into the pouring spout 49, or to force-feed material into the spout by means of a peristaltic hand pump, for example.

Also, it should be apparent that the closure may also include two end plugs 110—110 (see FIG. 1), one at each end of the cover portions 60—60. Typically, the end plugs 110—110 are made of a foam plastic material and are provided with openings therethrough to allow the cable to be extended into the closure. In the alternative, each end plug may comprise separable portions which are assembled about an entering cable.

The principles of this invention are also applicable to providing a cable support for a cable which has undergone sheath repair. Viewing now FIG. 11, there is shown a cable 121 which may have been damaged in any of various ways and which has been repaired. In the repair operation, conductors may have been spliced or otherwise reconnected together and portions of the sheath system repaired. It becomes important that movements of the cable be isolated from the repaired section of cable.

Figures 9, 11:
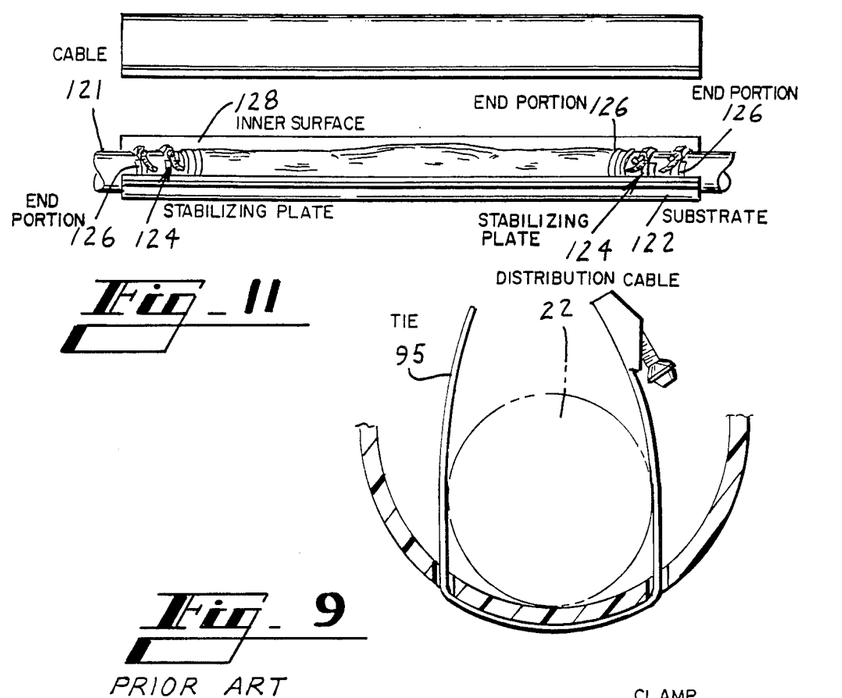
FIG. 11 is a perspective view of a cable which has undergone sheath repair and which is supported by a support system of this invention.

This is accomplished by providing a cable supporting substrate 122 which may be similar to the cover portion 60, for example. The length of the substrate 122 should be such that it spans the repaired section and extends for a distance to each side thereof. The substrate 122 is provided with a stabilizing plate 124 which is similar to the stabilizing plate 80. The stabilizing plates 124—124 are disposed external to the repaired portion of cable. End strap portions 126—126 of each stabilizing plate 124 are wrapped about the cable and secured thereto. Further, a center portion of each plate 124 between end portions 126—126 is arcuately shaped and remains in engagement with an inner surface 128 of the substrate 122.

As a result of this arangement, movements of the cable 121 are prevented from being transmitted to the repaired section. This protects the repaired section from being subjected to unwanted forces which otherwise might be transmitted to the connections, for example, or to elements of the sheath repair which may be more susceptable to dislocation than the original sheath system.

It is to be understood that the above-described arrangements are simply illustrative of the invention. Other arrangements may be devised by those skilled in the art which will embody the principles of the invention and fall within the spirit and scope thereof.

What is claimed is:

1. A cable and cable support system, which comprises: a length of cable;
   substrate means for enclosing a portion of said length of cable to shield the portion of the length of cable from a surrounding environment;
   stabilizing means attached to said substrate means and disposed within said substrate means for inhibiting movement of the portion of the cable, said stabilizing means having a portion thereof disposed between the portion of the length of the cable and said substrate means and extending from said portion of said stabilizing means between the portion of the length of the cable and said substrate means about and in engagement with at least a portion of the periphery of said cable; and
   means for securing said stabilizing means to the cable and cooperating with said stabilizing means to provide sufficient engagement with the cable to inhibit any movement of the portion of the length of the cable relative to said substrate means.

2. The cable support system of claim 1, wherein said stabilizing means includes plate means disposed between the cable and said substrate means and having spaced portions thereof which circumscribe the cable and a portion which is intermediate said spaced portions and which is substantially in engagement with said substrate means.

3. A cable closure for at least one cable, which comprises:

containment means for enclosing a portion of at least one cable whereat access to transmission media of the at least one cable occurs;

an encapsulating material which is disposed within said containment means for encapsulating portions of at least one cable within said containment means;

cover means for supporting and for enclosing the containment means and at least one cable along a length of the cable whereas access to the transmission media of the at least one cable occurs and portions of the at least one cable adjacent thereto; and stabilizing means connected to said cover means between said containment means and an entry location of at least one cable into said cover means, said stabilizing means having a portion thereof to be disposed between at least one cable and said cover means and having portions extending from the portion between the length of the at least one cable and the supporting means about the at least one cable; and means for securing said stabilizing means to at least one cable for cooperating with said stabilizing means to provide sufficient engagement with the at least one cable to prevent relative movement between the exposed transmission media within said containment means and the encapsulating material.

4. The cable closure of claim 3, wherein said stabilizing means and said securing means cooperate to circumscribe substantially the entire periphery of the at least one cable.

5. The closure of claim 4, wherein said stabilizing means includes spaced strap portions which are to be wrapped about at least one cable and means intermediate said strap portions which engages the cover means and provides torsional and bending stability for the at least one cable.

6. The closure of claim 5, which also includes two end plugs which are spaced apart and which are adapted to have cables extend therethrough to permit conductors of the cables to be spliced together, wherein said cover means includes two cover portions which are capable of being assembled together and said stabilizing means is attached to an inner surface of one of said cover portions external to said containment means, each of said cover portions being generally semi-circular in cross section and including one longitudinal edge portion which comprises a rib and another longitudinal edge portion which includes a groove so that when said two cover portions are mated together, the rib of one portion is aligned with the groove of the other and the groove of the one portion is aligned with the rib of the other portion, and which also includes clamping means for securing together the longitudinal edge portions of said two cover portions.

7. A kit of parts adapted to be assembled together to provide a cable support system, said kit comprising:

substrate means adapted to enclosed a length of a cable;

stabilizing means adapted to be connected to said substrate means with said substrate means at a location external to a portion of the length of the cable, said stabilizing means adapted to have a portion thereof disposed between the length of the cable and said substrate means and adapted to extend from said portion of said stabilizing means between the cable and said substrate means about at least a portion of the cable; and means adapted to secure said stabilizing means to the cable for cooperating with said stabilizing means to provide sufficient engagement with the cable to inhibit substantially any movement of the portion of the length of the cable relative to said substrate means.

8. The kit of parts of claim 7, wherein said stabilizing means includes plate means adapted to be disposed between the length of the cable and said substrate means and having spaced portions thereof adapted to circumscribe the cable at the location and a portion which is intermediate said spaced portions and which is adapted to be in substantial engagement with said substrate means.

9. A kit of parts adapted to be assembled together to provide a cable closure for splice work between cables having end portions which extend into the closure, said kit comprising;

containment means adapted to enclose splice work between cables and to hold an encapsulating material which encapsulates spliced portions of the cables;

cover means for supporting and for enclosing said containment means and cable portions which extend into said containment means;

stabilizing means adapted to be connected to said cover means between said containment means and an entry location of the cable into said cover means, said stabilizing means adapted to have a base portion thereof disposed between at least one cable and said cover means and portions extending from said base portion about the at least one cable; and means adapted to secure said stabilizing means to the at least one cable and adapted for cooperating with said stabilizing means to provide sufficient engagement with the at least one cable to prevent substantially unintended relative movement between the spliced portions of the at least one cable and the encapsulant.

10. The kit of parts of claim 9, wherein said cover means includes two cover portions which are adapted to be assembled together to enclose said containment means, and said stabilizing means and said securing means being adapted to cooperate to circumscribe substantially the entire periphery of the at least one cable.

11. The kit of parts of claim 10, which also includes locking means adapted to be snap-locked over longitudinal edge portions of the cover portions for securing together said two cover portions, said locking means being disengageable from said cover portions to allow reentry into the closure.

12. The kit of parts of claim 11, wherein said stabilizing means includes a plate which is secured to an inner surface of one of said cover portions and disposed in an arcuate configuration, said plate including two spaced slots formed along each longitudinal edge portion thereof to provide end strap portions having a center portion therebetween, said slots permitting end strap portions of said plate to become wrapped about a cable end portion which becomes disposed in engagement with said plate.

13. The kit of parts of claim 12, wherein said one cover portion includes openings therein adjacent to said plate which is attached thereto, and wherein said means adapted to secure said stabilizing means includes clamping means adapted to be extended through said openings in said one cover portion and wrapped about an end strap portion which is disposed in engagement with a cable end portion, wherein said clamping means includes two clamps which are associated with each said plate, one of said two clamps adapted to be disposed about one end strap portion of said plate and the other clamp adapted to be disposed about the other end strap portion of said plate, each clamp causing its associated end strap portion to become secured about a cable end portion and wherein the center portion of each stabilizing plate remains in engagement with an inner surface of the cover portion to which the plate is attached to provide torsional and bending stability for the cable.

* * * * *